United States Patent
Sharpe et al.

(10) Patent No.: US 8,639,276 B2
(45) Date of Patent: Jan. 28, 2014

(54) MOBILE TELEPHONE INTERACTIVE CALL DISPOSITION SYSTEM

(75) Inventors: Timothy David Sharpe, Redmond, WA (US); Cameron Ali Etezadi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/824,498

(22) Filed: Jun. 29, 2007

(65) Prior Publication Data

US 2009/0003580 A1    Jan. 1, 2009

(51) Int. Cl.
*H04W 4/16*    (2009.01)

(52) U.S. Cl.
USPC ...... 455/461; 455/415; 455/417; 379/210.01; 379/76

(58) Field of Classification Search
USPC ............... 379/210.01, 76, 211.02, 212.01, 379/209.01, 215.01, 82; 455/461, 415, 417, 455/421
See application file for complete search history.

(56) References Cited

U.S. PATENT DOCUMENTS

| | | | |
|---|---|---|---|
| 5,526,406 A | 6/1996 | Luneau | |
| 5,559,860 A | 9/1996 | Mizikovsky | |
| 5,764,279 A | 6/1998 | Ford et al. | 348/15 |
| 5,872,841 A * | 2/1999 | King et al. | 379/210.01 |
| 6,122,347 A | 9/2000 | Borland | |
| 6,373,925 B1 | 4/2002 | Guercio et al. | |
| 6,529,586 B1 | 3/2003 | Elvins et al. | |
| 6,711,239 B1 | 3/2004 | Borland | |
| 6,944,277 B1 | 9/2005 | Viikki | |
| 6,970,915 B1 | 11/2005 | Partovi et al. | 709/217 |
| 7,127,238 B2 | 10/2006 | Vandermeijden et al. | |
| 7,127,400 B2 | 10/2006 | Koch | 704/270.1 |
| 7,127,403 B1 | 10/2006 | Saylor et al. | 704/275 |
| 7,142,645 B2 | 11/2006 | Lowe | |
| 7,242,754 B2 | 7/2007 | Adams et al. | 379/201.02 |
| 7,620,160 B2 * | 11/2009 | Tidwell et al. | 379/88.25 |
| 7,653,380 B2 * | 1/2010 | Graefen | 455/414.1 |
| 8,223,932 B2 | 7/2012 | Forbes et al. | |
| 8,280,025 B2 | 10/2012 | Sharpe et al. | |
| 2001/0048736 A1 | 12/2001 | Walker et al. | 379/88.23 |
| 2004/0037403 A1 | 2/2004 | Koch | |

(Continued)

FOREIGN PATENT DOCUMENTS

| WO | WO 03/052607 | 6/2003 | ............. G06F 15/16 |
|---|---|---|---|
| WO | 2005/088990 A1 | 9/2005 | |

OTHER PUBLICATIONS

New Telephone Speech Corpora at CSLU. 1995. pp. 1-4, http://citeseer.comp.nus.edu.sg/cache/papers/cs/2304/ftp:zSzzSzspeech.cse.ogi.edu/Szpub/Szdocs/S/corpus.dev1.pdf/cole95new.pdf.

(Continued)

*Primary Examiner* — Allahyar Kasraian
(74) *Attorney, Agent, or Firm* — Merchant & Gould

(57) ABSTRACT

An interactive call disposition system that may operate on a mobile telephone independently of any remote or network-based information or functionality is provided. Upon receiving an incoming telephone call, the interactive call disposition system may automatically dispose of the call (e.g., call forwarding, voicemail, etc.), or the interactive call disposition system may conduct an interactive exchange with the calling party via an interactive voice response (IVR) system or via dual-tone, multi-frequency (DTMF) key input from the calling party. The interactive exchange between the interactive call disposition system and the calling party may accomplish disposition of the call based on calling party and called party information, such as calendar data, free/busy data, contacts information, and the like.

14 Claims, 5 Drawing Sheets

(56) References Cited

U.S. PATENT DOCUMENTS

| | | | |
|---|---|---|---|
| 2004/0081305 A1 | 4/2004 | Gonzalez et al. | |
| 2004/0218743 A1* | 11/2004 | Hussain et al. | 379/201.11 |
| 2004/0235520 A1* | 11/2004 | Cadiz et al. | 455/557 |
| 2005/0117730 A1* | 6/2005 | Mullis et al. | 379/210.02 |
| 2006/0003761 A1 | 1/2006 | Fry et al. | 455/426.1 |
| 2006/0028951 A1 | 2/2006 | Tozun et al. | |
| 2006/0052091 A1 | 3/2006 | Onyon et al. | |
| 2006/0104293 A1 | 5/2006 | Kopp et al. | 370/401 |
| 2006/0165050 A1 | 7/2006 | Erhart et al. | 370/351 |
| 2006/0206340 A1 | 9/2006 | Silvera et al. | 704/278 |
| 2006/0210033 A1 | 9/2006 | Grech et al. | |
| 2006/0291640 A1 | 12/2006 | Nagesh et al. | |
| 2007/0036284 A1 | 2/2007 | Raghav et al. | 379/67.1 |
| 2007/0117549 A1 | 5/2007 | Arnos | |
| 2008/0034064 A1 | 2/2008 | Choi et al. | |
| 2008/0130632 A1 | 6/2008 | Leong | 370/352 |
| 2008/0275701 A1 | 11/2008 | Wu et al. | |
| 2009/0003538 A1 | 1/2009 | Sharpe et al. | 379/70 |
| 2009/0232288 A1 | 9/2009 | Forbes et al. | |
| 2011/0231182 A1 | 9/2011 | Weider et al. | |

OTHER PUBLICATIONS

Sawhney et al., *ACM Transactions on Computer-Human Interaction*. 7(3): Sep. 2000. pp. 353-383 "Nomadic Radio: Speech and Audio Interaction for Contextual Messaging in Nomadic Environments." http://interruptions.net/literature/Sawhney-TOCHI00-p353-sawhney.pdf.

U.S. Appl. No. 12/049,281, filed Mar. 15. 2008. entitled "Appending Content to a Telephone Communication". Inventors: Scott C. Forbes. Sean Olson, Jeremy Buch. Dawson Yee. Timothy Mark Moore. and Kalyan Shankar Basu.

Drishti-Soft.Com., "PACE Ahead with DACX Ameyo," pp. 1-3, <http://www.drishti-soft.com/ivr.php>.

Cisco Systems, "Cisco IPCC Callback Option Data Sheet," pp. 1-5, http://www.cisco.com/web/CA/events/pdfs/IPCC_Callback_Option_DS.pdf.

FileCart.com, "Xtend IVR Developer Edition 3.0," pp. 1-2, Aug. 16, 2007, http://www.filecart.com/details/30878/357/XTend_IVR_Developer_Edition.php.

CTiLabs, "Mobile Ringback Tone Service," Date: Nov. 24, 2004, pp. 1-4, http://www.ctilabs.de/de/sol/infos/ringback.pdf.

Microsoft.com/Speech/Speech2004, "Microsoft Speech Server: Features & Benefits," pp. 1-2, http://www.microsoft.com/speech/evaluation/tools/default.mspx, publicly know at least as early as Jun. 29, 2007.

3D2F.com, "CallButler Unlimited 1.0," Nov. 12, 2006, pp. 1-4, http://3d2f.com/programs/1-640-callbutler-unlimited-download.shtml.

SMARTHOME, "The Caller ID System That Speaks for Itself," Date: Apr. 3, 2007, pp. 1-4, http://www.smarthome.com/5154cw.html.

SoftRunner Inc., "eCaller ID™ It Speaks for Itself," Date: Apr. 3, 2007, pp. 1-5, http://softrunner.com/callerid/.

ClassCo, "More Than Caller ID—Convenience—Security—Accessibility," Date: Apr. 3, 2007, pp. 1-4, https://www.classco.com/catalog.php.

AlWorldSoft.Com., "PhoneTray Fee 1.20," Date: Apr. 3, 2007, pp. 1-2, http://www.allworldsoft.com/software/13-506-phonetray-free.htm.

U.S. Appl. No. 11/824,474, filed Jun. 29, 2007, entitled "Automated Unique Call Announcement", Inventors: Timothy D. Sharpe and Cameron Ali Etezadi.

U.S. Office Action mailed Nov. 23, 2011 in U.S. Appl. No. 12/049,281, 13 pages.

U.S. Office Action mailed Nov. 30, 2011 in U.S. Appl. No. 11/824,474, 11 pages.

U.S. Office Action cited in U.S. Appl. No. 11/824,474 mailed Jun. 8, 2011.

U.S. Appl. No. 14/102,260, filed Dec. 10, 2013 entitled "Virtual Personal Operator," Inventor: Skovron et al.

* cited by examiner

Mobile Computing Device

MOBILE TELEPHONE INTERACTIVE CALL DISPOSITION SYSTEM

RELATED CASE

This application is related to U.S. patent application Ser. No. 11/824,474, filed Jun. 29, 2007 and entitled "Automated Unique Call Announcement," and to U.S. patent application Ser. No. 12/049,281, filed Mar. 15, 2008, and entitled "Appending Content to a Telephone Communication," which applications are hereby incorporated by reference.

BACKGROUND

With the advent of mobile telephones, users may send and receive calls at any time of day so long as they are within the reach of a mobile telephone signaling system with which they may send and receive calls. Unfortunately, users often receive calls at inconvenient times, for example, when they are driving, when they are in a meeting, when they are asleep, etc. Additionally, some businesses or highly mobile professionals and workers use mobile telephones as business telephones, and missing or not properly disposing of mobile telephone calls when the user is unavailable can mean the loss of valuable business information or sales.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the invention solve the above and other problems by providing a mobile telephone-based interactive call disposition system that operates on a mobile telephone independently of any remote or network-based information or functionality. Upon receiving an incoming telephone call, the interactive call disposition system may automatically dispose of the call (e.g., call forwarding, voicemail, etc.), or the interactive call disposition system may conduct an interactive exchange with the calling party via an interactive voice response (IVR) system or via dual-tone, multi-frequency (DTMF) key input from the calling party. The interactive exchange between the interactive call disposition system and the calling party may accomplish disposition of the call based on calling party and called party information, such as calendar data, free/busy data, contacts information, and the like.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
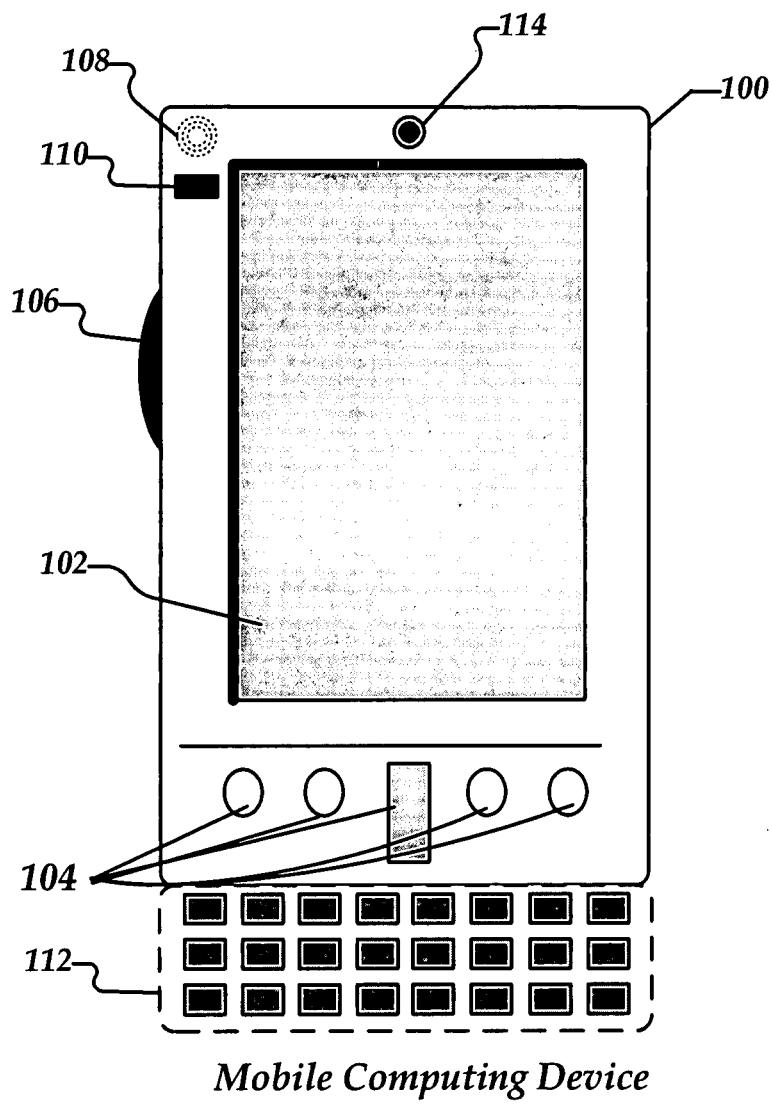
FIG. 1 is a diagram of an example mobile telephone/computing device.

As briefly described above, embodiments of the present invention are directed to interactive call disposition on a mobile telephone. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention may be utilized for both mobile and wired telephones. For purposes of illustration, embodiments of the present invention will be described herein with reference to a mobile telephone 100 having a telephone system 200, but it should be appreciated that the components described for the mobile telephone 100 with its mobile telephone system 200 are equally applicable to a wired telephone having similar or equivalent functionality for providing unique call announcements described herein.

The following is a description of a suitable mobile device, for example, the camera phone or camera-enabled computing device, discussed above, with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 102 and input buttons 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
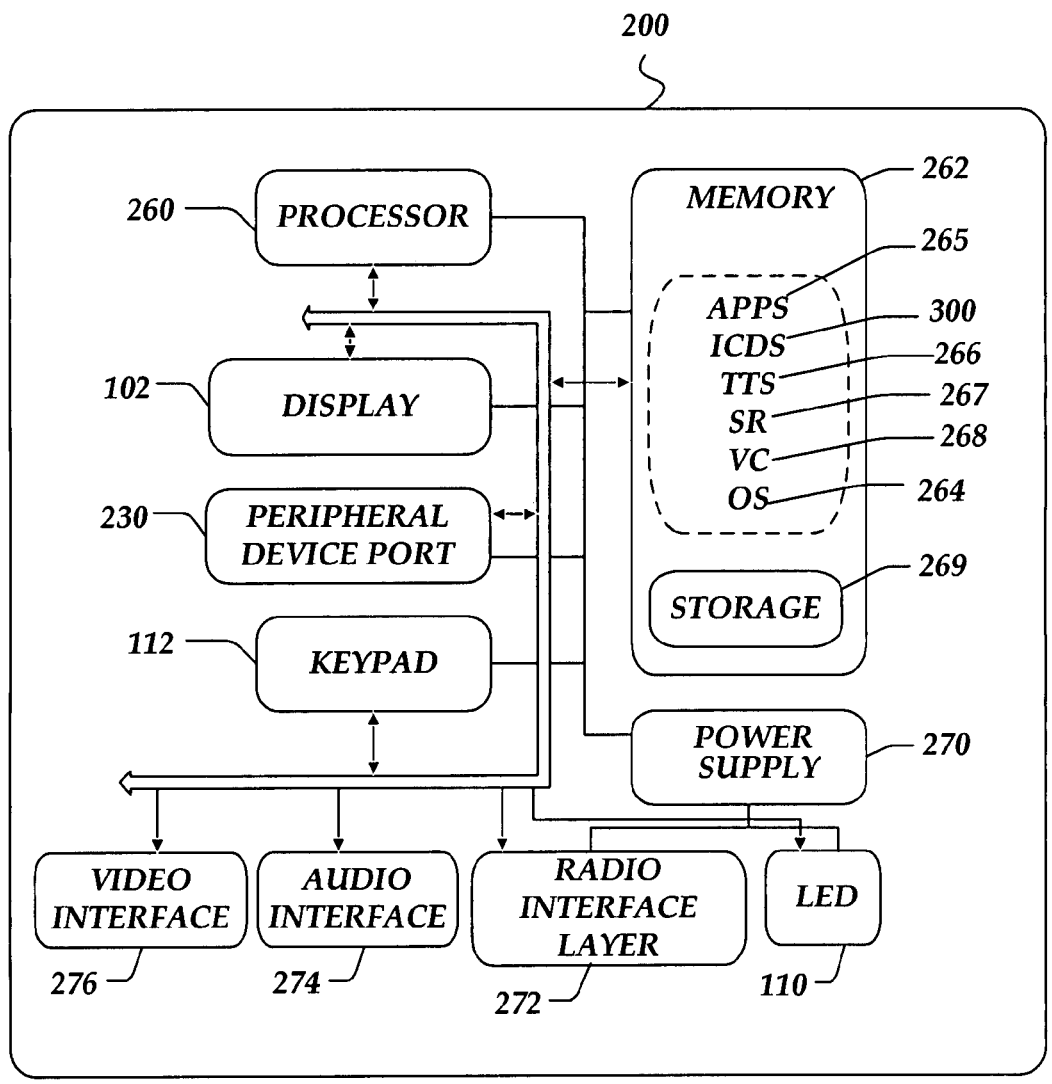
FIG. 2 is a block diagram illustrating components of a mobile telephone/computing device that may serve as an operating environment for the embodiments of the invention.

FIG. 2 is a block diagram illustrating components of a mobile computing device used in one embodiment, such as the mobile telephone/computing device 100 illustrated in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, email, scheduling, instant messaging, and media player applications. System 200 can execute an Operating System (OS) such as, WINDOWS XP®, WINDOWS MOBILE 2003® or WINDOWS CEO available from MICROSOFT CORPORATION, REDMOND, WASHINGTON. In some embodiments, system 200 is integrated as a computing device, such as an integrated personal digital assistant (PDA) and wireless phone.

In this embodiment, system 200 has a processor 260, a memory 262, display 102, and keypad 112. Memory 262 generally includes both volatile memory (e.g., RAM) and non-volatile memory (e.g., ROM, Flash Memory, or the like). System 200 includes an Operating System (OS) 264, which in this embodiment is resident in a flash memory portion of memory 262 and executes on processor 260. Keypad 112 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 265 are loaded into memory 262 and run on or outside of operating system 264. Examples of application programs include phone dialer programs, e-mail programs, PIM (personal information management) programs, such as electronic calendar and contacts programs, word processing programs, spreadsheet programs, Internet browser programs, and so forth. System 200 also includes non-volatile storage 268 within memory 262. Non-volatile storage 269 may be used to store persistent information that should not be lost if system 200 is powered down. Applications 265 may use and store information in non-volatile storage 269, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 269 synchronized with corresponding information stored at the host computer. In some embodiments, non-volatile storage 269 includes the aforementioned flash memory in which the OS (and possibly other software) is stored.

As briefly described above, the applications 265 may include a variety of applications useful in providing information with which an automated unique call announcement may be generated. For example, the applications 265 may include an electronic scheduling, calendaring, and contacts application, for example, MICROSOFT OUTLOOK, with which electronic mail, calendaring information, scheduling information and contacts information may be maintained by the called party on the called party telephone/computing device 100. For example, a contacts module of such an application may be used to store contact information for example, name, address, telephone number, and the like for a variety of contacts that may include calling parties from which the called party may receive an incoming telephone call. A calendaring or scheduling component of such an application may allow the called party to enter a variety of scheduling information, including appointments for meetings, for example, an appointment for which the called party may receive an incoming telephone call. Such contacts, calendaring and scheduling information may be stored at storage 269.

The applications 265 may include additional applications useful for providing interactive call disposition. For example, a global positioning system (GPS) application for obtaining location information for the calling or called party may be provided. For example, if the calling party is calling from the mobile telephone/computing device 100, a global positioning system application may be utilized for determining a location of the calling party and for presenting that information to the called party for use in a unique call announcement. Other positioning systems may be utilized as alternates to a global positioning system. For example, an application programming interface (API) may be utilized in the mobile telephone 100 for calling a local or remote location service and for passing contact information or other identifying information for a calling party to a location service for returning location information for the called party.

The interactive call disposition system (ICDS) 300 is operative to provide a variety of dispositions of incoming telephone calls without requiring a called party to answer a call. The ICDS 300 is illustrated as part of a mobile telephone 100, but the ICDS could be equally operative on a wired telephone. Operation of the ICDS 300 is described below with reference for FIGS. 3-5.

The text-to-speech (TTS) engine 266 is a software application operative to receive text-based information from the ICDS 300 and to generate an audible announcement from the received information. As is well known to those skilled in the art, the TTS engine 266 may access a large lexicon or library of spoken words, for example, names, places, nouns, verbs, articles, or any other word of a designated spoken language for generating an audible announcement for a given portion of text. The lexicon of spoken words may be stored at storage 269. According to embodiments of the present invention, once an audible announcement is generated from a given portion of text, the audible announcement may be played via the audio interface 274 of the telephone/computing device 100 through a speaker, earphone or headset associated with the telephone 100. For example, if the ICDS passes a text item such as "call from Bob at his office" to the TTS engine 266, the TTS engine 266 may utilize a large lexicon of spoken words to generate an audible announcement of "call from Bob at his office" that may be played to the called party via a speaker on the telephone 100 or via an associated earphone or headset.

The speech recognition (SR) module 267 is a software application operative to receive an audible input from a called or calling party and for recognizing the audible input for use in call disposition by the ICDS 300. Like the TTS engine 266, the speech recognition module may utilize a lexicon or library of words it has been trained to understand and to recognize. According to embodiments of the present invention, the SR module 267 may recognize spoken input from a calling party for determining how to dispose of an associated incoming call so that the called party does not have to answer the call if desired.

The voice command (VC) module 268 is a software application operative to receive audible input at the telephone 100 and to convert the audible input to a command that may be used to direct the functionality of the telephone 100 and to dispose of incoming telephone calls according to embodiments of the present invention. According to one embodiment, the voice command module 268 may be comprised of a large lexicon of spoken words, a recognition function and an action function. The lexicon of spoken words may be stored at storage 269. When a command is spoken into a microphone of the telephone/computing device 100, the voice command module 268 receives the spoken command and passes the spoken command to a recognition function that parses the spoken words and applies the parsed spoken words to the lexicon of spoken words for recognizing each spoken word. Once the spoken words are recognized by the recognition function, a recognized command, for example, "forward this call to Joe," may be passed to an action functionality that may be operative to direct the activities of the telephone 100. For example, a spoken phrase such as "forward this call to Joe," may be utilized by the voice command module to invoke the forwarding functionality of the telephone 100, to retrieve a forwarding telephone number for the "forwarded-to" party from a contacts database, and to cause the incoming telephone call to be forwarded, or otherwise processed as directed.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 265 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices. The LED 110 may be used to provide visual notifications and an audio interface 274 may be used with speaker 108 (FIG. 1) to provide audio notifications. These devices may be directly coupled to power supply 270 so that when activated, they remain on for a duration dictated by the notification mechanism even though processor 260 and other components might shut down for conserving battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 114 (FIG. 1) to record still images, video stream, and the like. According to some embodiments, different data types received through one of the input devices, such as audio, video, still image, ink entry, and the like, may be integrated in a unified environment along with textual data by applications 265.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 269. Computer storage media may include volatile and nonvolatile, removable and non-removable media implemented in any method or technology for storage of information, such as computer readable instructions, data structures, program modules, or other data.

Figure 3:
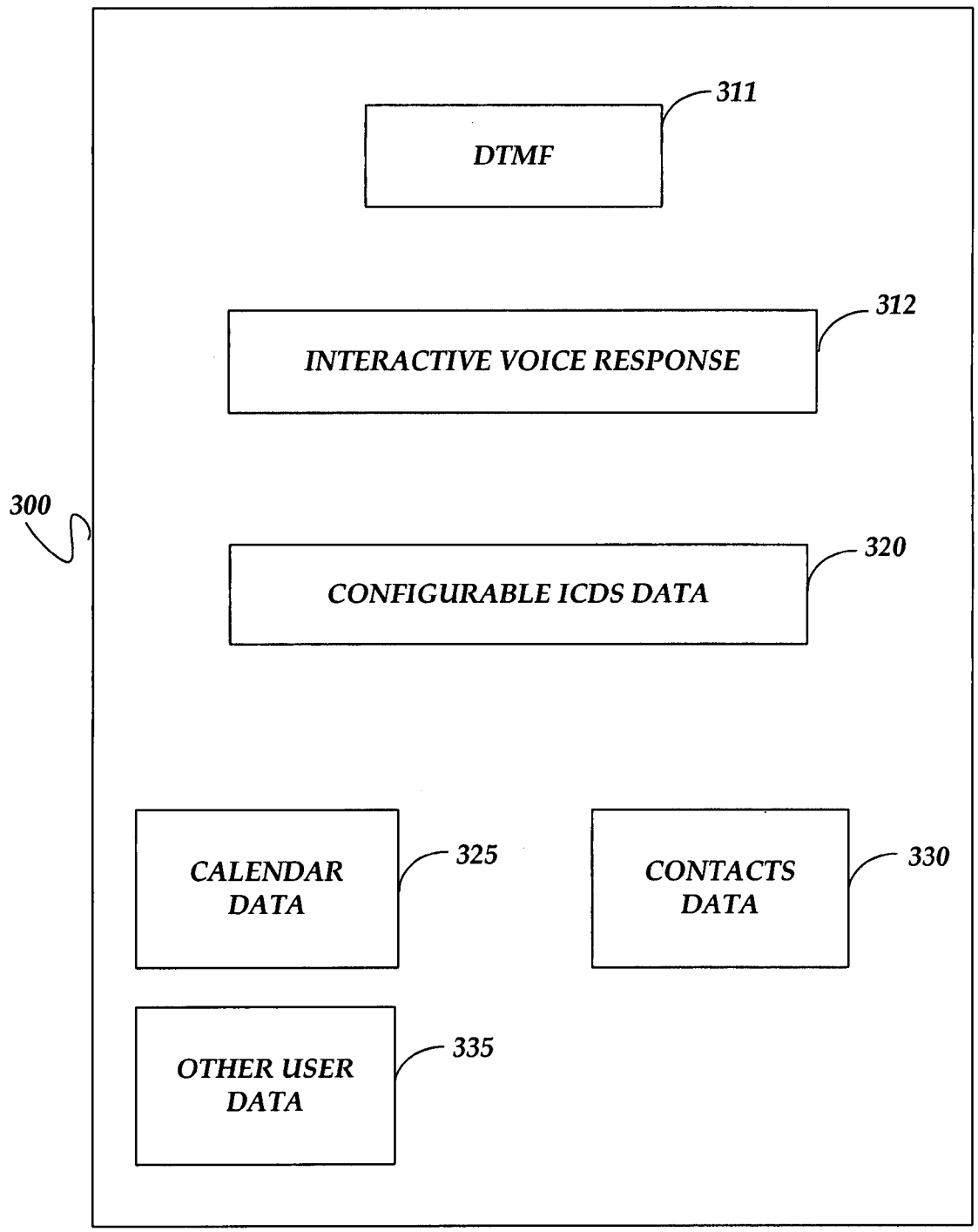
FIG. 3 is a simplified block diagram illustrating components of an interactive call disposition system.

Referring now to FIG. 3, the interactive call disposition system 300 is resident on the mobile telephone 100 and is operative to dispose of incoming telephone calls to the mobile telephone 100 via an automatic call disposition configuration or via an interactive exchange between the interactive call disposition system 300 and a calling party. For example, as will be described in detail below, the interactive call disposition system (ICDS) 300 may intercept an incoming telephone call to the mobile telephone 100 and automatically dispose of the telephone call by forwarding the telephone call to a designated forwarding party, by directing the incoming telephone call to voicemail, by providing a canned voice or text response to the calling party such as "the called party cannot answer at this time, please call back at another time," or other dispositions, including ignoring the telephone call without interrupting the calling party.

In addition, as will be described below, the ICDS 300 may conduct an interactive exchange with the calling party to provide the calling party information about the called party and to receive input from the calling party. For example, the ICDS 300 may instruct the calling party via a voice or text message that the called party is presently in a meeting, and the ICDS 300 may ask the calling party if the calling party can call back at a later prescribed time based on an availability in the called party's calendar. If the calling party responds affirmatively to the offered time for a return call, the ICDS 300 may automatically place a calendar item associated with the anticipated return call in the called party's electronic calendar, followed by terminating the call from the calling party. In addition, as will be described below, the ICDS 300 is operative to allow input from the called party during an incoming telephone call to allow the ICDS system 300 to dispose of the call from the calling party without requiring the called party to actually answer the telephone call.

Referring still to FIG. 3, the interactive call disposition system (ICDS) 300 may include a dual-tone, multi-frequency (DTMF) module 311. The DTMF module 311 is operative for receiving key tone input from a calling or called party via a telephone keypad 112 of the mobile telephone 100. According to embodiments, the ICDS system 300 may present questions or other requests for data input from a calling or called party, and may provide an opportunity for the calling or called party to respond via key tone input. For example, a question may be posed to a calling party, for example, "if you can call back at 3:00 p.m., press "1," if not, press "2." If the responding party presses one of the two offered keys, the DTMF system 311 is operative to receive the entered key tone associated with the selected key and for converting the received input to a digital signaling form that may be used by the ICDS system 300 as input responsive to the request for information posed to the calling or called party.

The ICDS 300 also may include an interactive voice response (IVR) module 312. The IVR module 312 illustrates one or more software application modules loaded onto the mobile telephone 100 for providing interactive communications between the interactive call disposition system 300 and a calling party. According to one embodiment, the IVR module 312 may provide input to and receive input from the TTS engine 266, the SR module 267 and/or the VC module 268 for conducting an interactive exchange with a calling party or as an intermediary between a calling party and the called party without requiring the called party to answer an associated call. For example, the IVR module 312 may recognize voice commands from a calling party via the SR module 267 and pass the recognized voice commands to the VC module 268 for causing the ICDS 300 to dispose of an associated call as described herein.

The configurable ICDS data 320 may include a variety of configurable data provided by the called party for disposing of incoming telephone calls. For example, as will be described below, a called party may configure the system 300 for ignoring all calls received during a designated quiet or "no answer" period during which the called party does not desire to answer incoming telephone calls. Likewise, the configuration data 320 may include instructions to forward incoming calls to designated forwarding parties, to interact with a calling party based on the called party's calendar entries, to pass an incoming call to voicemail, and the like. In addition, the configuration data may include instructions for processing calls based on any special circumstances. For example, if it is known that a calling party (from calendar data or contacts data) will frequently be in situations where a return call from the called party will interrupt the calling party, then an offering of an alternative responsive communication, for example, instant messaging or electronic mail, may be made.

In addition, the configuration data 320 may include a variety of structured comments or questions that may be provided to a calling party in response to an incoming call. For example, a canned comment such as "call from <calling party> for your scheduled appointment at <appointment time>" may be stored in the configuration data 320. Then, if the called party has configured the ICDS system 300 to notify the called party when an incoming call is being received based on the called party's calendar items, such a canned or structured comment may be utilized by the ICDS system 300 for providing a text-based or speech-based notification to the called party of the nature of an incoming call before the called party actually answers the incoming call. As should be appreciated, the canned or structured comment, described herein, is provided for purposes of example only and is not limiting of the vast number of configurable canned or structured comments, questions, or responses that may be stored in the configuration data 320 for processing telephone calls to the mobile telephone 100, as described herein.

According to one embodiment, such canned or structured comments, questions or responses may be structured according to a markup language, such as the Extensible Markup Language (XML) for allowing the efficient bringing together of data with tagged portions of the canned or structured comments, responses or questions. For example, with respect to the above illustrated comment, "call from <calling party> for your scheduled appointment at <appointment time>," the tagged items <calling party> and <appointment time> may illustrate XML tags that may be used for inserting appropriate data at the proper locations in the canned comment. For example, if an incoming call is received, and it is determined that the illustrated comment should be provided to the called party, the name of a calling party associated with the incoming call, and data from the called party's electronic calendar may be obtained for applying to the canned comment for presenting to the calling party. As should be understood, the example structured comment, described above, is not meant to illustrate, nor describe well-formed XML markup, but is provided for purposes of example only.

According to an embodiment, the configuration data may be applied to the mobile telephone 100 locally via input from the called party directly into the mobile telephone 100. Alternatively, the configuration data may be input to the mobile telephone from a remote source, for example, the called party's home or office computer that may access the mobile telephone 100 via the radio 272 or other suitable wireless or wired interface or connection. In addition, data used by the ICDS, for example, calendar data, contacts data, and other user data, described below, may be obtained by the ICDS from local storage on the mobile telephone 100, or such data may be obtained from remote storage media accessible by the mobile telephone 100 via the radio 272 and/or via a distributed computing network, such as the Internet.

The calendar data 325 is illustrative of calendar data associated with an electronic calendar application operated and stored on the mobile telephone 100 or accessible by the mobile telephone 100 from a remote or networked calendar data source. According to embodiments of the present invention, calendar data 325 for the called party may be utilized by the ICDS system 300 for interacting with a calling party based on calendar data of the called party. For example, if the calling party places a call to the called party at a time during which the called party may not be disturbed, the ICDS system 300 may parse the calendar data 325 to determine the next available time at which the called party may receive a call. The next available time may then be used to populate a speech-based or text-based comment or question to the calling party, for example, "the calling party is presently in a meeting, his next available time to receive a call is 3:00 p.m."

According to embodiments, calendar data for both the calling party and the called party may be updated by the ICDS 300 via an interactive exchange between the parties, as described herein. For example, if a next available calling time is provided to a calling party as set out above, an automatic meeting request may be sent to both parties via an electronic mail address obtained for the parties from contacts data, described below. If electronic mail addresses are not known for one or both parties, alternate notification means may be employed, for example, text messages containing the new appointment.

The contacts data 330 is illustrative of contacts data maintained by the called party on the mobile telephone 100 via an electronic contacts application operated on the mobile telephone 100. As described above for the calendar data 325, the contacts data may be maintained on the mobile telephone 100 or may be accessible by the mobile telephone 100 from a remote database. According to embodiments, contacts data may be utilized by the ICDS system 300 for providing information to the called party about an incoming telephone call or for providing information to the ICDS 300 for disposing of the telephone call. For example, if an incoming telephone call includes a caller identification that identifies the telephone directory number of the incoming telephone call, but does not identify the calling party, the ICDS system 300 may parse the contacts data 330 to determine if the telephone directory number of the incoming call matches a person identified in the contacts data 330. If so, the identity of the calling party may be used in a speech-based or text-based notification to the calling party as to the identity of the calling party. In addition, contacts data 330 may be used by the ICDS system 300 for disposing of an incoming call, for example, for finding a telephone directory number associated with a designated forwarding party for an incoming call.

Other user data 335 may include additional data provided by the called party for use by the ICDS 300 in disposing of incoming telephone calls. For example, other user data 335 may include preferences for processing incoming telephone calls according to the time of day, for example, calls received during business hours may be processed differently than calls received after business hours. For another example, other user data 335 may include other presence status for the called party in addition to calendar data. Such presence status data may include the called party's instant messenger status or free/busy status. For another example, other user data 335 may include user-defined comments or questions to be provided to a calling party during times the called party does not wish to answer an incoming call.

In addition, other user data may include information for directing a calling party to communicate with the called party via alternate communication means, for example, instant messaging, text messaging and electronic mail. Additional information that may be stored in the other user data 335 may include electronic mail addresses, text messaging addresses, instant messaging addresses and the like which may be passed to a calling party to direct the calling party that, while the called party may not be available to answer an incoming telephone call, the called party may be able to communicate with the calling party via one of these alternate communication means. According to an embodiment, when a calling party is offered an alternative means of communicating with the calling party, the alternative communication channel may be automatically employed by the ICDS 300. For example, in the case of text messaging, the ICDS may automatically send a text message of the form "Hello, you called Friday at 2:00 pm—what is the nature of your call?" The calling party may then reply to the text message without having to initiate another type of communication. In the case of electronic mail, the ICDS may automatically send an email to the email address of the calling party (if known). In the case of instant messaging (IM), a conversation window may be started between the two parties and an automated greeting may be sent on behalf of the called party, such as "You called?"

As described above, the called party or operator/user of the mobile telephone 100 may configure the ICDS system 300 for operating according to a variety of different configurations. For example, the called party may configure the ICDS system 300 to automatically answer and dispose of incoming calls according to the configuration data 320 without notifying the called party that the incoming call has been received. For example, the called party may configure the system 300 to operate in such a manner during a period of time in which the called party may not be disturbed. For another example, an instruction may be included in the data 320 that a call from a certain contact may never be allowed to leave a message or to interact with the called party via the ICDS. That is, a call from this contact may only be passed to the called party via a conventional call without the benefit of the ICDS. Alternatively, a call from another contact, for example, the called party's employer, may be designated such that a call from this contact is always put through to the called party without being first processed by the ICDS.

The system 300 may be configured such that the called party may interact with the calling party via the ICDS 300 without requiring the called party to actually answer the telephone. For example, if a telephone call is received, the called party may receive a text-based message on the screen of the mobile telephone 100, or a speech-based message via a speaker, headset, or earphone of the mobile telephone 100 that identifies the incoming call and that allows input from the called party without answering the telephone call. For example, an incoming call may be identified to the called party as "this is your 2:00 o'clock call from Bob, to answer press "1", to ignore press "2." In response, the called party may press "1" to answer the call, or the called party may press "2" which in turn may cause the ICDS system 300 to provide a text-based or voice-based message to the calling party such as "the calling party cannot take your call at this time, please call back later." Thus, the called party is able to interact with the calling party without actually answering the telephone call.

According to an embodiment, the called party may interact with the calling party by choosing a canned responsive message, typing a responsive message, or speaking a responsive message, all of which may be done without requiring the called party to answer the call. Interaction between the parties may allow a calling party to provide additional information, for example, whether the call is urgent. If a calling party designates a call as urgent, a subsequent announcement may be provided to the called party or a customized ring tone may be provided to alert the called party that the call is urgent.

According to another embodiment, the ICDS 300 may be operative to allow the called party to monitor an interaction between the ICDS 300 and the calling party by providing a text-based presentation of the interaction between the ICDS 300 and the calling party on the screen 102 of the mobile telephone 100. For example, referring to FIG. 4, if the called party has configured the ICDS 300 to automatically dispose of an incoming telephone call based on the called party's calendar data or free/busy data 325, and the called party has configured the ICDS 300 to allow the called party to monitor an interaction between the ICDS 300 and the calling party, a text-based interaction may be provided as illustrated in FIG. 4.

Figure 4:
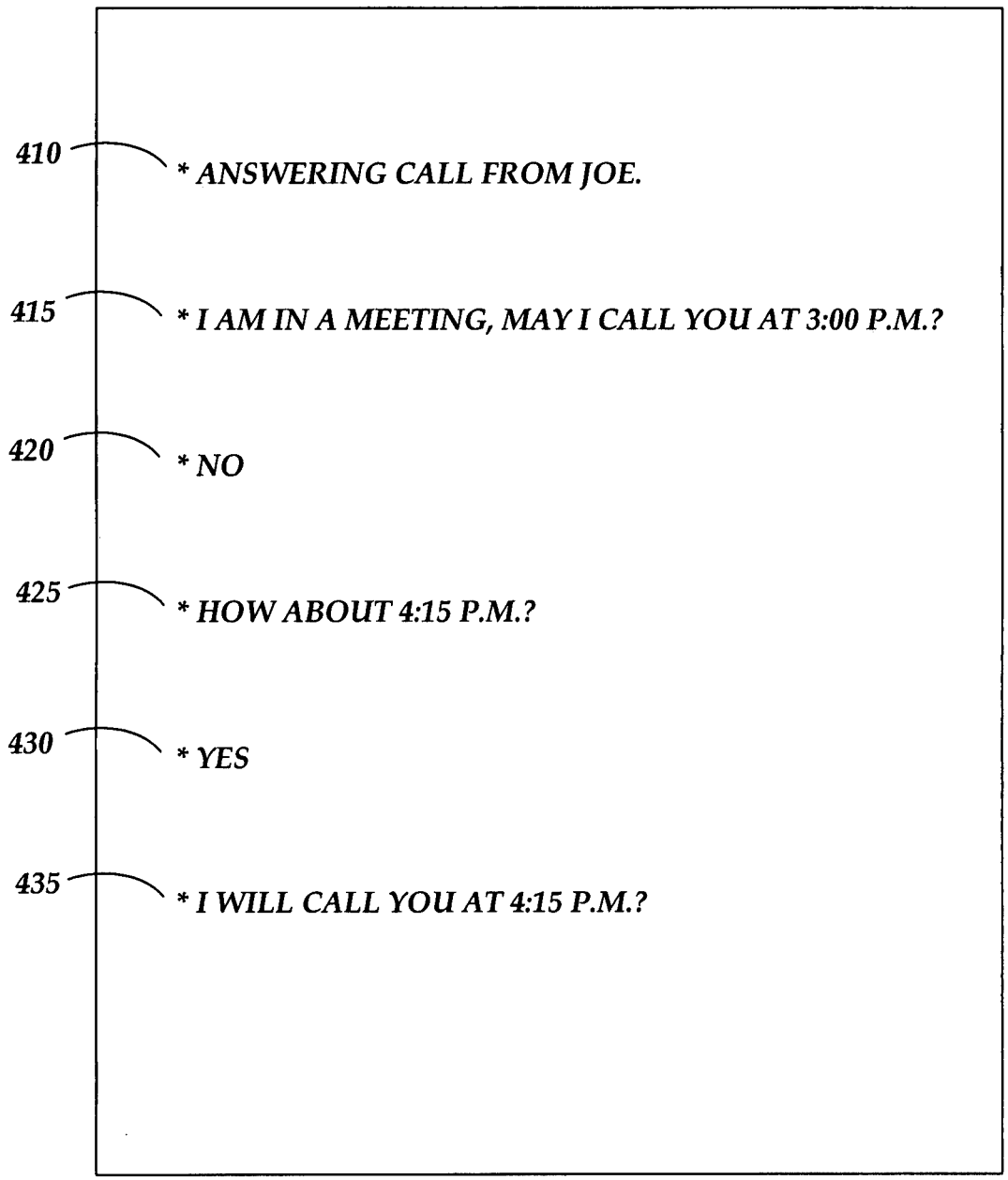
FIG. 4 illustrates a computer-generated screen display that may be displayed on a mobile telephone showing an interactive communication between a calling party and an interactive call disposition system.

Referring to FIG. 4, in response to an incoming call, the ICDS 300 presents a text-based statement 410 of "Answering call from Joe." In response, the ICDS 300 presents a canned response 415 back to the calling party of "I am in a meeting, may I call you at 3:00 p.m.?" by obtaining the next available call time from the called party's calendar data 325. If the calling party responds "No," or selects a DTMF key associated with a negative reply, the calling party's response 420 may be provided on the screen 102, as illustrated in FIG. 4. In response, the ICDS 300 may obtain a next call opportunity from the called party's calendar data 325, and may prepare a response 425 to the called party of "How about 4:15 p.m.?" If the calling party responds in the affirmative, as illustrated in FIG. 4, the ICDS 300 may then send a responsive message 435 to the calling party of "I will call you at 4:15 p.m." as illustrated in FIG. 4. From the example illustrated in FIG. 4, it is shown that the ICDS 300 may conduct an interactive exchange with the calling party without requiring the called party to answer the telephone call. That is, the entire exchange illustrated in FIG. 4 is conducted between the ICDS 300 and the calling party without involvement by the called party, unless the called party desires to interrupt the exchange and actually answer the telephone call. Thus, the ICDS 300 may efficiently and politely dispose of the telephone call for the called party without interrupting the called party at a time during which the called party may not be interrupted.

As should be appreciated, the exchange illustrated in FIG. 4 is a text-based exchange that is provided onscreen to the called party to allow the called party to monitor the exchange taking place between the ICDS 300 and the calling party. The exchange illustrated in FIG. 4 may be converted from text to speech and may be played to the called party via a speaker on the mobile telephone 100 or via a headset or earphone operatively associated with the mobile telephone 100. For example, if the called party utilizes a Bluetooth-enabled earphone/microphone combination, the called party may listen to a text-to-speech version of the exchange illustrated in FIG. 4 over her earphone without having to answer the incoming telephone call.

Figure 5:
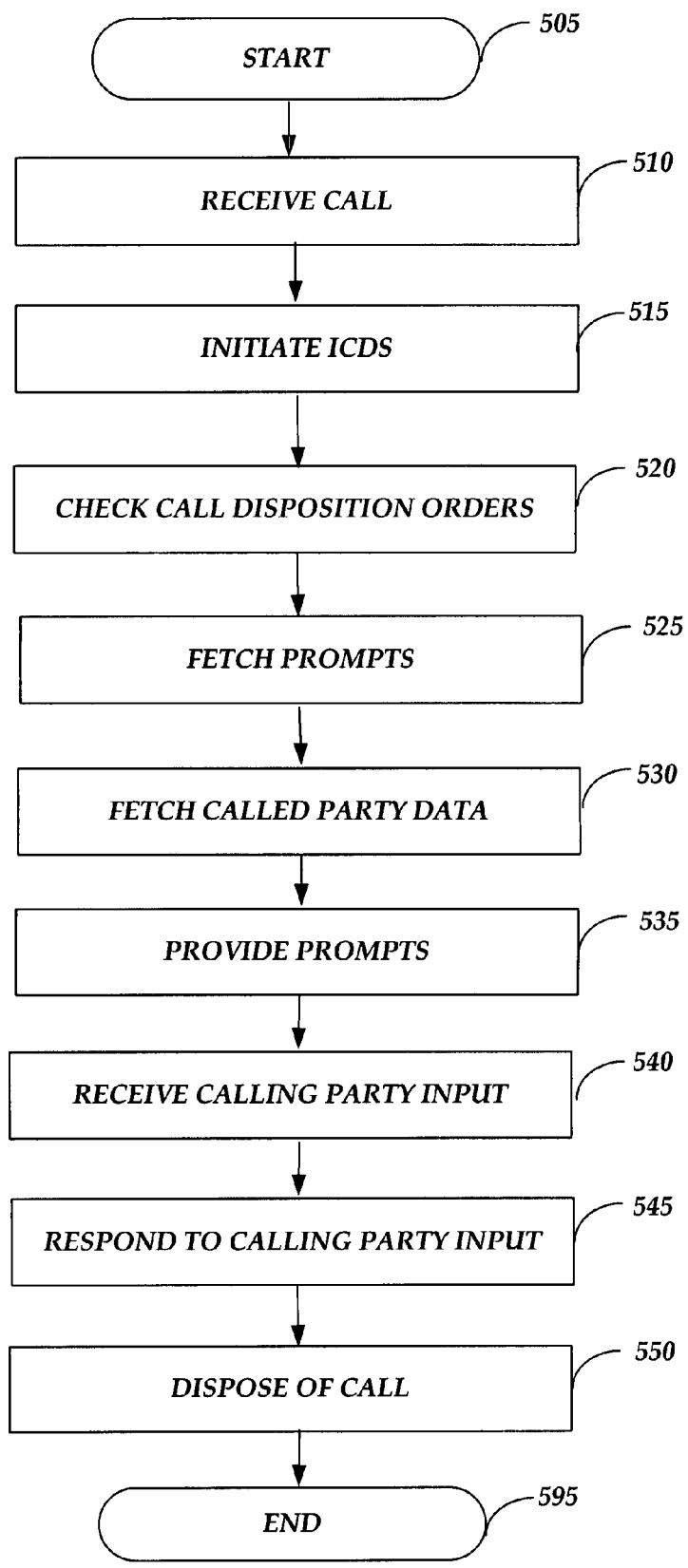
FIG. 5 is a logical flow diagram illustrating a method for interactive call disposition.

Having described an operating environment for and components of an interactive call disposition system with reference to FIGS. 1-4 above, FIG. 5 is a logical flow diagram illustrating a method for interactive call disposition. The routine 500 begins at start operation 505 and proceeds to operation 510 where an incoming call is received from a calling party to the operator/user of the mobile telephone 100. At operation 515, initiation of operation of the ICDS 300 begins based on configuration data 320 provided by the called party. For example, as described above, if the ICDS 300 is configured to automatically answer and dispose of incoming telephone calls during a time at which the incoming telephone call at operation 510 is received, then the ICDS 300 automatically "wakes up" and responds to the incoming telephone call, as described herein.

At operation 520, the ICDS 300 checks the configuration data 320 to determine call disposition orders prescribed by the called party (operator/user of the mobile telephone 100). For example, the called party may have directed that all calls received between 9:00 a.m. and 5:00 p.m. be processed according to a configuration associated with the called party's business, and the called party may have configured the ICDS system 300 to process all calls received after 5:00 p.m. according to a configuration associated with the called party's after hours personal environment.

At operation 525, any prompts (canned comments, responses, or questions) required for disposing of the incoming telephone call are fetched from the configuration data 320 or other user data 335 by the ICDS 300. For example, if based on the incoming call, a comment of "the calling party will not be available until after <calling time>" is necessary for the incoming call, then the canned comment will be obtained by the system 300 from the configuration data 320 for population with an appropriate next calling time from the calendar data 325, as described above. At operation 530, any called party data, for example, calendar data, contacts data or other user data needed for preparing a canned or interactive response or exchange for the calling party is obtained by the system 300. At operation 535, the ICDS 300 prepares and provides required prompts to the calling party as either audible or speech-based prompts via the TTS engine 312 or text-based prompts, as described above.

At operation 540, any calling party input or response to the provided prompts is received by the ICDS 300. At operation 545, if a response is required to input received from the calling party, the ICDS 300 may provide responsive prompts or information, as described above, and as illustrated in FIG. 4. At operation 550, the incoming call is disposed of or terminated after provision of information to the calling party, after conducting an interactive exchange with the calling party or after the incoming telephone call is answered or otherwise terminated by the called party. The routine 500 ends at operation 595.

The following is an example operation of embodiments of the present invention described herein. As should be appreciated, the following example operation is for purposes of illustration only and is not limiting of the vast numbers of other call dispositions that may be accomplished according to embodiments of the present invention. Consider, for example, that Sue runs a small business called "Sue's Sewing Company." She has several regular clients, gets new customer inquiries several times a day, and has a large number family and friends. She marks the contact cards for her family into a family group, her friends into a friends group, and her regular clients into a client group. She configures the configuration data 320 for all unknown callers (callers not identified in the contacts data 330) to be treated as new clients. Sue configures the ICDS 300 (and configuration data 320) to provide call disposition announcements based on the time of the day and whether the store is open or closed. For example, a configured announcement that may be provided when Sue cannot answer an incoming call may include "Good evening. Thank you for calling Sue's Sewing Company. Our hours are 8:00 am-6:00 pm, Monday through Saturday. We are currently closed. To inquire about our pricing, press, '1,' to leave a message for Sue, press '2,' and to request that Sue call you back at this number, press '3.'" Sue configures the ICDS 300 for her regular clients (identified in her contacts data 330) to announce based on the time of day and status of their order, for example "Good Morning Mr. Smith and thank you for your business with Sue's Sewing. Your order is ready for pickup. We're open until 6:00 pm today and again at 8:00 am tomorrow. To request that I leave your order in the drop box so you can get it after hours press, '1,' to leave a message for Sue press, '2,' to speak with Bob press, '3,' to request that Sue call you back at this number, press '4.'"

Sue configures the ICDS for her friends to announce her schedule and a positive thought for the day, for example "Good morning Mom. The thought for today is keep your head up. I'm busy until 3:00 pm. If you want me to call you back after 3:00 pm, press '1,' if its about lunch tomorrow, press '2,' to leave me a message press '3.'" In the case that the caller presses '2,' for the latter message, the following interaction could be presented: "I'm looking forward to lunch tomorrow at 12:00 pm at 'The That Place.' If you need to cancel this meeting, press '1,' If you want to change the time, press '2' then type in the new time followed by the '#' sign, If you want to change the location we'll meet, press '3' to leave me a voice message with the new location." In each case, described above, the selection of keypad numbers or symbols are processed by the DTMF module 311 to provide the ICDS 300 the calling party's input and the utterance of voice messages are processed by the SR module 267. If a text message is received as part of the exchange, it may be processed directly by the ICDS 300 or may be converted to speech by the TTS engine 266 for providing a speech-based announcement to the called party if desired.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of providing interactive call disposition on a mobile telephone, comprising:
    receiving an indication of an incoming telephone call;
    determining whether a called party is available to answer the incoming call;
    retrieving information about the incoming call;
    retrieving information about the called party;
    receiving configuration data from the called party, the configuration data comprising instructions for processing calls to the called party based on at least contacts data for a calling party and upon determining, from at least the contacts data, that a return call from the called party will interrupt the calling party;
    generating a custom call announcement upon determining, based on at least the contacts data, that the return call from the called party will interrupt the calling party, the custom call announcement comprising at least one of instant messaging and electronic mail, the custom call announcement further notifying the calling party that the called party is not available to answer the incoming call based on information retrieved about the incoming call and based on information retrieved about the called party, the custom call announcement comprising a notification to the calling party that the called party is not available to answer the incoming call at the time of the incoming call, but that the called party will be available to answer a subsequent incoming call at a later prescribed time;
    presenting the custom call announcement to the calling party; and
    in response to presenting the custom call announcement to the calling party, receiving, by the called party, a responsive communication from the calling party indicating that the calling party will place a subsequent incoming call to the called party at the prescribed time.

2. The method of claim 1, wherein prior to generating the custom call announcement that notifies the calling party that the called party is not available to answer the incoming call at the time of the incoming call, but that the called party will be available to answer the subsequent incoming call at the later prescribed time, parsing calendar data for the called party to determine the later prescribed time at which the called party will be available to answer the subsequent incoming call.

3. The method of claim 1, further comprising populating calendar data for the called party with information that identifies that the called party will receive an incoming call from the calling party at the prescribed time.

4. The method of claim 1, wherein generating the custom call announcement that notifies the calling party that the called party is not available to answer the incoming call based on information retrieved about the incoming call and based on information retrieved about the called party, includes generating the custom call announcement that notifies the calling party that the called party is not available to answer the incoming call at the time of the incoming call, and that the incoming call is being forwarded to another called party who may answer the incoming call.

5. The method of claim 4, wherein prior to generating the custom call announcement that notifies the calling party that the called party is not available to answer the incoming call at the time of the incoming call, and that the incoming call is being forwarded to another called party who may answer the incoming call, parsing a configuration data to obtain instructions for forwarding the incoming call to another called party when the called party is not available to answer the incoming call.

6. The method of claim 5, further comprising, in response to presenting the custom call announcement to the calling party, allowing a responsive communication from the calling party indicating that the calling party does not desire that the incoming call be forwarded to another called party.

7. The method of claim 1, further comprising, in response to presenting the custom call announcement to the calling party, receiving a responsive communication from the calling party for furthering a disposition of the incoming call without requiring the called party to answer the incoming call.

8. The method of claim 7, wherein receiving a responsive communication from the calling party for furthering a disposition of the incoming without requiring the called party to answer the incoming call, includes receiving the responsive communication via a dual tone, multi-frequency (DTMF) input from the calling party.

9. The method of claim 7, wherein receiving a responsive communication from the calling party for furthering a disposition of the incoming without requiring the called party to answer the incoming call, includes receiving the responsive communication via an interactive voice response input from the calling party.

10. The method of claim 7, further comprising allowing the called party to receive the custom call announcement provided to the calling party and allowing the called party to receive the responsive communication from the calling party for furthering a disposition of the incoming call for allowing the called party to monitor interactive call disposition communications with the calling party without requiring the called party to answer the incoming call.

11. A computer readable storage device containing computer executable instructions which when executed by a computer perform a method of providing interactive call disposition on a mobile telephone, comprising:
    receiving an indication of an incoming telephone call;
    determining whether the called party is available to answer the incoming call;
    receiving configuration data from the called party, the configuration data comprising instructions for processing calls to the called party based on at least contacts data for a calling party and upon determining, from at least the contacts data, that a return call from the called party will interrupt the calling party;
    generating a custom call announcement upon determining, based on at least the contacts data, that the return call from the called party will interrupt the calling party, the custom call announcement comprising at least one of instant messaging, text messaging and electronic mail, the custom call announcement further notifying the calling party that the called party is not available to answer the incoming call based on information retrieved about the incoming call and based on information retrieved about the called party, the custom call announcement comprising a notification to the calling party to communicate with the called party via an alternate communication means;

presenting the custom call announcement to the calling party; and
receiving a call disposition command from the called party for disposing of incoming call without requiring the called party to answer the incoming call.

12. The computer readable storage device of claim 11, further comprising, in response to presenting the custom call announcement to the calling party, receiving a responsive communication from the calling party for furthering a disposition of the incoming call without requiring the called party to answer the incoming call.

13. The computer readable storage device of claim 12, wherein receiving a responsive communication from the calling party for furthering a disposition of the incoming without requiring the called party to answer the incoming call, includes receiving the responsive communication via a dual tone, multi-frequency (DTMF) input from the calling party.

14. A computer readable storage device containing computer executable instructions which when executed by a computer perform a method of providing interactive call disposition on a mobile telephone, comprising:
   receiving an indication of an incoming telephone call;
   retrieving information about the incoming call;
   retrieving information about a called party;
   receiving configuration data from the called party, the configuration data comprising instructions for processing calls to the called party based on at least contacts data for a calling party and upon determining, from at least the contacts data, that a return call from the called party will interrupt the calling party;
   generating a custom call announcement upon determining, based on at least the contacts data, that the return call from the called party will interrupt the calling party, the custom call announcement comprising at least one of instant messaging and electronic mail, the custom call announcement further notifying the calling party that the called party is not available to answer the incoming call based on information retrieved about the incoming call and based on information retrieved about the called party by notifying the calling party to communicate with the called party via an alternate communication means;
   presenting the custom call announcement to the calling party;
   receiving a responsive communication from the calling party; and
   allowing the called party to monitor the presentation of the custom call announcement to the calling party and the received responsive communication from the calling party without requiring the called party to answer the incoming call.

\* \* \* \* \*